United States Patent [19]

Smith

[11] Patent Number: 4,489,594

[45] Date of Patent: Dec. 25, 1984

[54] PAD CLAMP FOR CLOSING OFF WATER PORT IN ENGINE BLOCK

[75] Inventor: Jeffrey G. Smith, Velinda, Calif.

[73] Assignee: Irontite Products Co., Inc., El Monte, Calif.

[21] Appl. No.: 482,132

[22] Filed: May 3, 1983

[51] Int. Cl.³ .............................................. G01M 3/04
[52] U.S. Cl. ..................................................... 73/49.7
[58] Field of Search ................. 73/49.7, 49.8; 49/156, 49/480; 248/279, 287, 660, 661, 178, 179; 403/53, 61, 63, 83, 87, 104, 110; 408/110; 269/82

[56] References Cited

U.S. PATENT DOCUMENTS

| | | | |
|---|---|---|---|
| 1,068,170 | 7/1913 | Royce | 403/61 X |
| 2,630,342 | 3/1953 | Gilmont | 403/53 |
| 4,342,221 | 8/1982 | Silvey | 73/49.7 |

Primary Examiner—Jerry W. Myracle

[57] ABSTRACT

My invention is of simple construction. It is easy to mount in place and efficiently holds the pad 43 to close the port 14. Because of the vertical slot 18 the bar 17 may be adjusted vertically so that the upper end 25 may be properly positioned even though the threaded opening 20 may be at a different elevational position.

4 Claims, 4 Drawing Figures

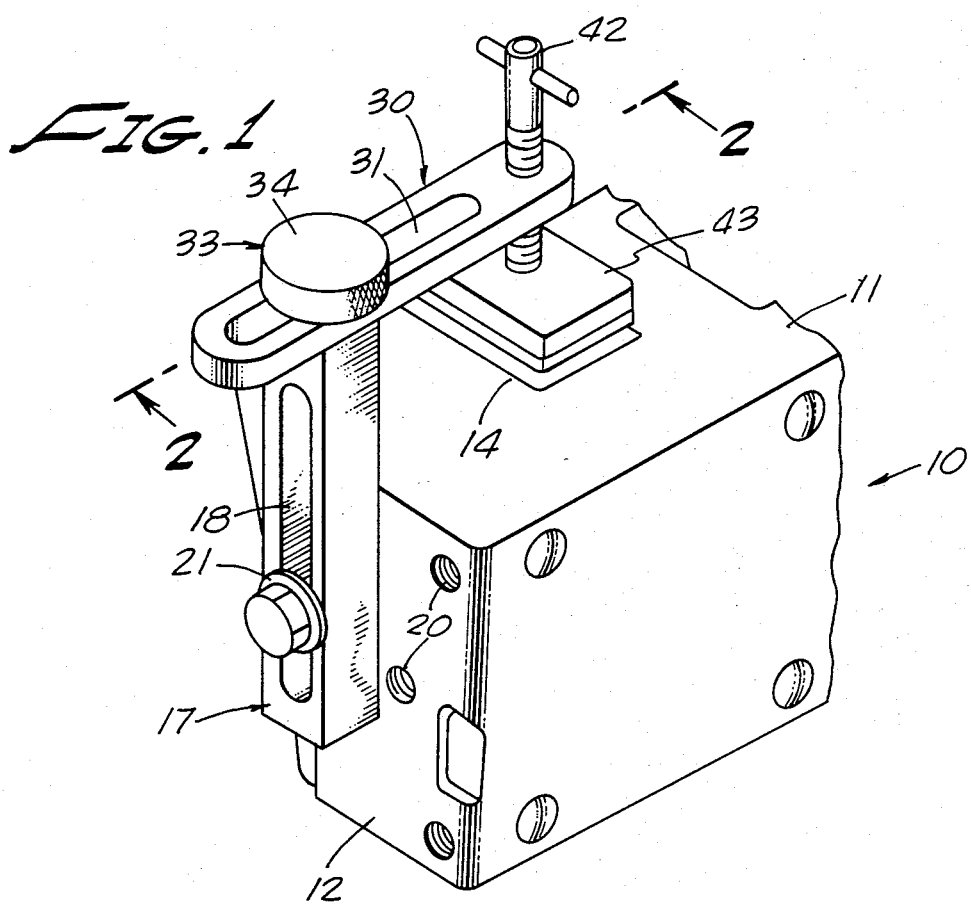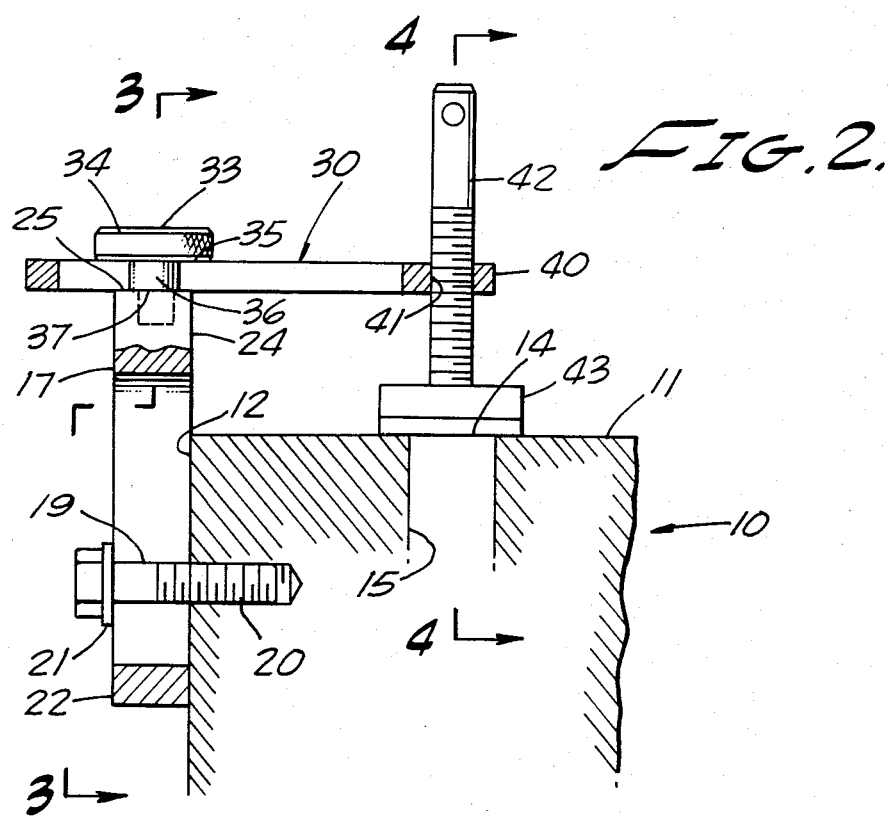

PAD CLAMP FOR CLOSING OFF WATER PORT IN ENGINE BLOCK

BACKGROUND OF THE INVENTION

My invention relates to a pad clamp for closing off the water port in an engine cylinder head or block. Internal combustion engine cylinder heads and particularly diesel engine cylinder heads are complex castings possessing numerous internal coolant fuel injector and exhaust gas passages. In diesel engines higher pressures and temperatures are required for proper combustion of the fuel and because of these higher pressures, cracks may develop in the walls which separate the numerous internal passages which can cause a detrimental intermixing of coolant fluid, exhaust gases and so forth.

The cylinder head or block can be tested for leaks by removing the head or block from the engine and sealing off the ports which connect the internal coolant passages with the other passages in the engine block, and subjecting the cylinder head passages to compressed air or other fluid under pressure. By applying a soap or other suitable solution to the cylinder head or part to be tested, it is then possible to locate any cracks or leaks between the coolant passages and other passages.

A major problem in the pressure testing of engine cylinder head or block is that the heads come in many different sizes with numerous different configurations of coolant and other passages, thus requiring a variety of complicated plates, plugs, pads and clamps to seal the parts to be tested.

The need for the pad clamp arrangement of my invention is due to the peculiar location and positioning of the water ports on some engine heads in such a way as to render impossible the clamping of the pad tightly in such a way as to render impossible the clamping of the pad tightly in place with the use of currently-used types of pad clamps.

In my invention a slotted vertical mounting member is bolted by a stud bolt on an end or side wall of the head and is so positioned that the clamp arm supported thereby may be extended to a position over the water port where a triple lead screw of the clamp arm is over the center of the pad which closes the water port. The clamp arm extends parallel to the top wall of the engine head. The clamp arm has a horizontal slot and by virtue of this slot the arm is mounted on the upper end of the slotted vertical member and is rotatably and slidably mounted on the vertical member so that the end of the clamp iron arm may be positioned in any location of a half circle and thus reach a water port at any place within said half circle. The end of the clamp arm carries a vertical triple lead screw which when positioned over the water port may engage and clamp the pad in a position closing the water port and permitting the testing to be made.

The engine cylinder head port closure pad clamp of U.S. Pat. No. 4,342,221 issued Aug. 3, 1982, to Silvey, is of no use unless there is a means on the surface wherein the water port is formed so that the port closure means can be mounted on that surface. Where there is no such means the port closure pad clamp is without utility.

My invention provides a means whereby the clamp device of my invention may be mounted on a side wall or end wall where the pivoted and slidable arm may extend over the surface where the port is formed and may close a port located at any place within a half circle.

It is an object of my invention to provide a pad clamp closure means which may be mounted on a side or end wall of the cylinder head, or other part to be tested, with a clamp arm extending over the horizontal wall in which the water port is located, the end thereof carrying the screw for tightening the closure pad in place may be used for closing a port, positioned anywhere within a relatively large half circle area on the surface in which the water port is located.

Referring to the drawings:

FIG. 1 is a perspective view showing a portion of an engine cylinder head or block with my invention attached thereto.

FIG. 2 is an elevational view taken along the line 2—2 of FIG. 1.

Figure 3:
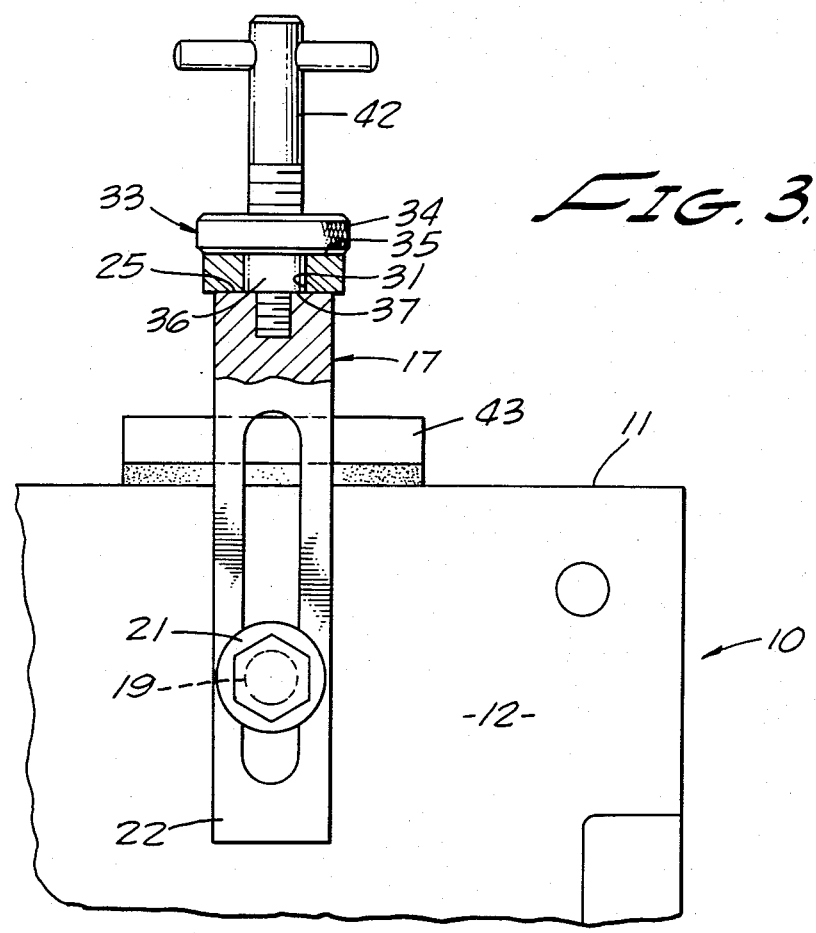
FIG. 3 is an elevational view of FIG. 2 taken in the direction of the arrows 3—3.
Figure 4:
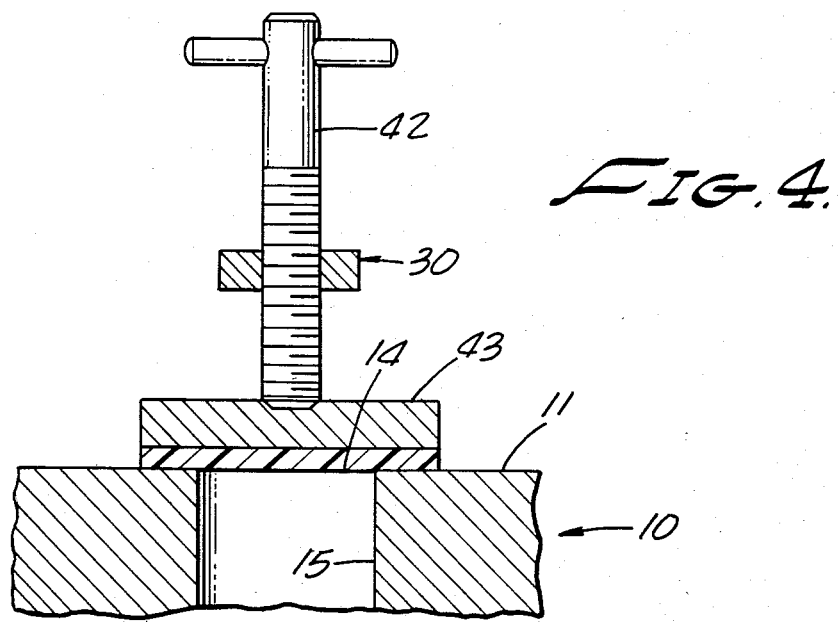
FIG. 4 is a sectional view taken along the line 4—4 of FIG. 2.

Referring to the drawings, FIG. 1 shows a portion of a cylinder head or block 10 having a top or horizontal mating-wall or surface 11 and vertical side surfaces or side walls 12. The word "horizontal" and the word "vertical" are used because the block is setting in the position shown. Applicant is not to be limited to the block being in this exact position when testing is being done.

The numeral 14 in FIG. 1 shows the port of a water passage 15 which is shown as being closed by the use of my invention, so that the testing can be done.

My invention shows a mounting means in the form of a mounting bar 17 which is rectangular in cross section. The mounting bar 17 has a slot 18 through which bolt 19 extends, the bolt being screwed into a threaded opening 20. The bolt is provided with a washer 21 which engages an outer surface 22 of the bar 17 whereby the surface 24 of the bar 17 is clamped against the side wall 17 thus securing mounting bar 17 in a vertically-extending position with the upper end 25 of the bar 17 positioned a distance above the surface 11.

The upper end 25 is positioned in a horizontal plane which is parallel to the plane of the mating-surface 11 of the cylinder head or block.

Mounted on the upper end 25 is a horizontally extending clamp arm 30 which extends parallel to the surface 11. The clamp arm 30 has a slot 31 through which an arm mounting means 33 is extended for mounting the arm so that it may be rotatably and slidably movable relative to the bar 17 in the horizontal plane.

As shown in FIGS. 2 and 3 the part 33 has a knurled head 34 which engages the upper surface 35 of the arm 30. A cylindrical portion 36 extends through the slot 31 and has a lower annular surface 37 which engages the upper end surface 25 of the vertical bar 17. The part 33 has a threaded portion 38 whereby it may be secured in place.

In actual practice the arm 30 is one-quarter (¼) of an inch thick and the spacing between the head 34 and the upper end of the mounting bar 17 is one-quarter (¼) of an inch plus five-thousandths (0.005) of an inch so that the arm is freely slidable and rotatable with respect to mounting arm 17.

At the end 40 of the arm 30 is a threaded opening 41 through which the screw 42 is threaded, the lower end of the member 42 engages the clamp pad 43 and clamps it over the port 14 thus sealing off the water passage 15 in order that the test may be made.

The clamp arm as stated is slidable and is also rotatable in order that the screw 42 may be positioned anywhere within the half-circle where it may be aligned with the port 14.

It may be seen that the clamp of my invention is intended for use where there are threaded openings 20 in the side walls 12.

I claim:

1. A port closing clamp means for sealing a surface port of an engine cylinder head or block or other engine part which may be positioned to have a horizontal surface in which a port of a water circulating conduit is located and having a side surface extending from said horizontal surface which side surface has at least one threaded opening therein which is spaced a distance from said horizontal surface, said clamp comprising:
   a. mounting means removably secured to said side surface of the engine part and extending therefrom to a position above said horizontal surface;
   b. an arm above said horizontal surface;
   c. means for rotatively and longitudinally mounting said arm at the upper end and on said mounting means;
   d. a port closure member adapted to close said port and;
   e. tightening means on said arm for tightening said port closure member against said horizontal surface to close said port.

2. A combination as defined in claim 1 in which said mounting means consists of a vertically positioned bar having means for clamping same against said side surface in a vertically adjustable position whereby the upper end of said bar may be positioned in a suitable position above said horizontal surface.

3. A combination as defined in claim 2 in which said means for securing said vertically extending bar against the side surface of said engine part consists of a bolt means extending through a longitudinal slot in said bar into an opening in said side surface, said bar being vertically adjusted so that the upper end thereof may be positioned in a suitable position above said horizontal surface position, such adjustment being made in accordance with the position of the said opening in said side surface.

4. A combination as defined in claim 1 in which said mounting means comprises;
   a. a vertically extending bar having its upper end positioned in a plane located above the plane of said horizontal surface, said upper end having a surface which is parallel to said horizontal surface, said bar having a vertical slot,
   b. screw means extending through said slot and into a threaded opening in said side surface, for mounting said bar against said side surface, said slot permitting said bar to be mounted in a selected vertical position, depending on the vertical position of said threaded opening, and
   c. a pin at the upper end of said bar, said pin extending through said longitudinal slot in said arm whereby said arm is longitudinally and rotatively movable on said bar.

* * * * *